Figure 1:
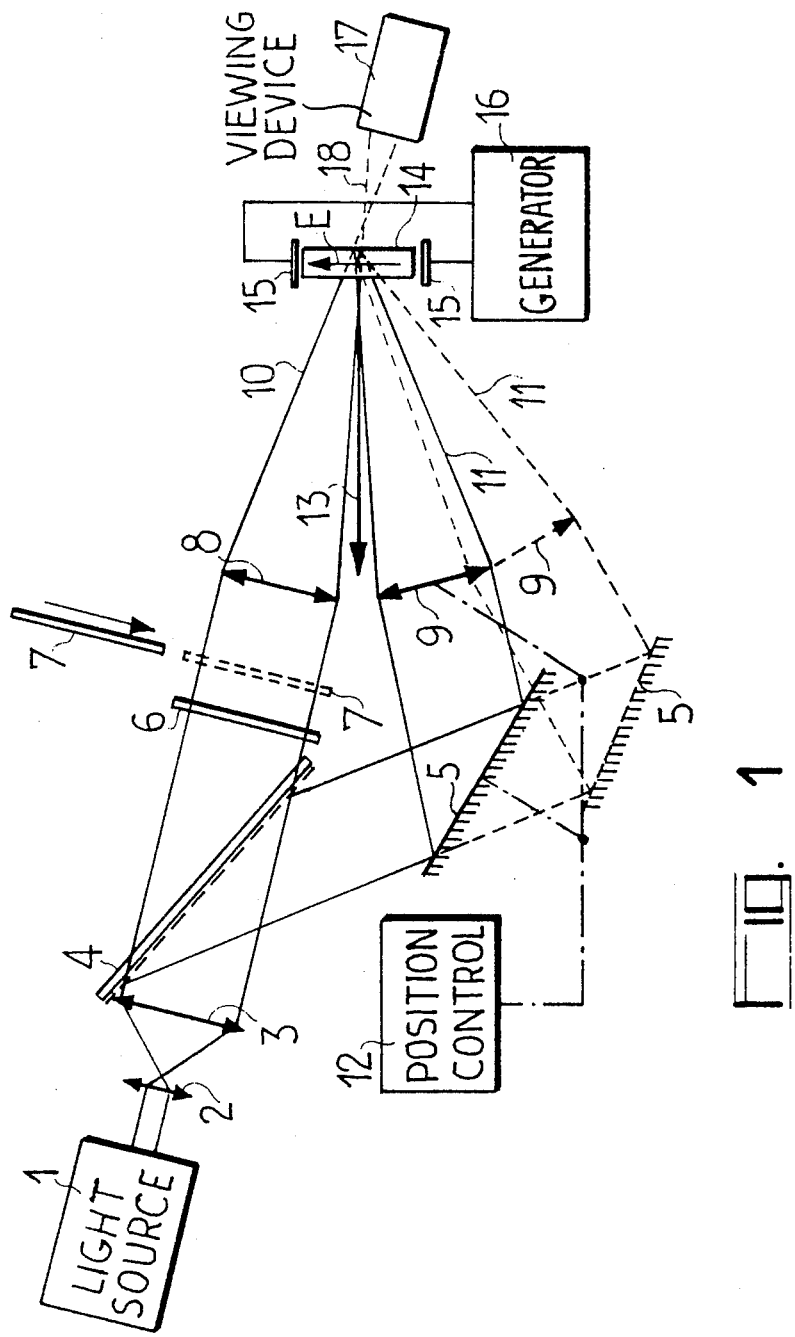

United States Patent
Micheron et al.

[11] 3,847,465
[45] Nov. 12, 1974

[54] HOLOGRAM FORMATION WITHIN A POLYCRYSTALLINE PHOTO EXCITABLE ELECTRO-OPTIC PLATE

[75] Inventors: Francois Micheron; Jean Nicolas; Mieczyslax Hildebrandt; Guy Bismuth; Antonio Hermasin, all of Paris, France

[73] Assignee: Thomson-CFS, Paris, France

[22] Filed: Nov. 14, 1972

[21] Appl. No.: 306,291

[30] Foreign Application Priority Data
Nov. 19, 1971  France .................. 71.41541

[52] U.S. Cl. .............. 350/3.5, 340/173 LT, 350/150
[51] Int. Cl. ........................................... G02b 27/00
[58] Field of Search ....... 350/3.5, 150; 340/173 LT, 340/173 LS

[56] References Cited
UNITED STATES PATENTS
3,652,145    3/1972    Thaxter ................. 350/3.5

OTHER PUBLICATIONS
Keneman et al, Applied Physics Letters, Vol. 17, No 4, Aug 1970, pp 173–5.

Maldonado et al., Proc. of the IEEE, Vol 59, No 3, Mar 1971, pp 368–382.

Meitzler et al., Electronics, Feb 1, 1971, pp 34–39.

*Primary Examiner*—Ronald J. Stern
*Attorney, Agent, or Firm*—Oblon, Fisher, Spivak, McClelland & Maier

[57] ABSTRACT

The present invention relates to holographic systems embodying a phase hologram pattern formed within the volume of a photoexcitable, electro-optic material.

The system in accordance with the present invention comprises a pattern of fringes formed in a photo-excitable polycrystalline material of quasi-theoretical density. A biased state is created electrically or by mechanical stress, in the polycrystalline material in order to permit the formation of an electronic density modulation condition capable of exploitation by electro-optical effect.

15 Claims, 6 Drawing Figures

HOLOGRAM FORMATION WITHIN A POLYCRYSTALLINE PHOTO EXCITABLE ELECTRO-OPTIC PLATE

The present invention relates to holographic systems designed to form, read and erase a holographic pattern capable of doing duty as an optical data carrier or a holographic lens; in each case, the holographic pattern scatters a coherent radiation in order to form the real or virtual image of an object. The invention relates more particularly to systems in which three-dimensional holographic patterns are formed by the photoexcitation of a plate of electro-optical material. Although it is well-known to produce phase holograms by the formation of a holographic pattern within the volume of a monocrystal such as lithium niobate, the application of this solution to high-capacity optical stores involves drawbacks.

One of these drawbacks is associated with the difficulty encountered in obtaining large-sized monocrystals with suitable physical and chemical properties. Another drawback is due to the use of a monocrystalline material, which seriously restricts the capabilities of the construction and reconstruction of phase holograms. In fact, the electro-optical effect of the monocrystal is predetermined both in magnitude and direction, and it cannot be adjusted to simultaneously achieve best read-out efficiency in certain zones of the crystal and to ensure selective erasure of the holographic pattern in contiguous zones.

To overcome these drawbacks, the invention provides for the holographic pattern to be formed in a holographic system the recording medium of which is a polycrystalline photoexcitable material.

In the absence of any electrical bias, the electro-optical properties of a polycrystalline material do not manifest themselves. To achieve the electro-optical property which results in the formation of the phase holographic pattern, means are provided to produce a state of electrical bias or polarization this state plays an active part during the process of recording the holographic pattern. Because of the polycrystalline nature of the holographic recording material, the electrical bias state can adopt a variety of forms both as concerns its orientation and its extent. The possibility is also available of erasing this artificially created bias state. Erasing is possible even if the material is operated in the temperature range in which it is ferroelectric. Whatever the case, the manufacture, in whatever size, of a polycrystalline substrate presents no problems; in particular, it is possible to make use of the technique of hot-pressing ceramic materials.

In accordance with the present invention, there is provided an optical system with photo-induced holographic pattern comprising: a plate of photoexcitable electro-optic material having a polycrystalline structure; photo-inducing means positioned for irradiating said plate with a pattern of interference fringes, and bias means for generating within at least one portion of the volume of said plate a predetermined state of electrical polarization; said material having a density differing from its theoretical density by less than five thousandths; said state being formed during the writing in and reading out phases of said holographic pattern.

Figure 2:
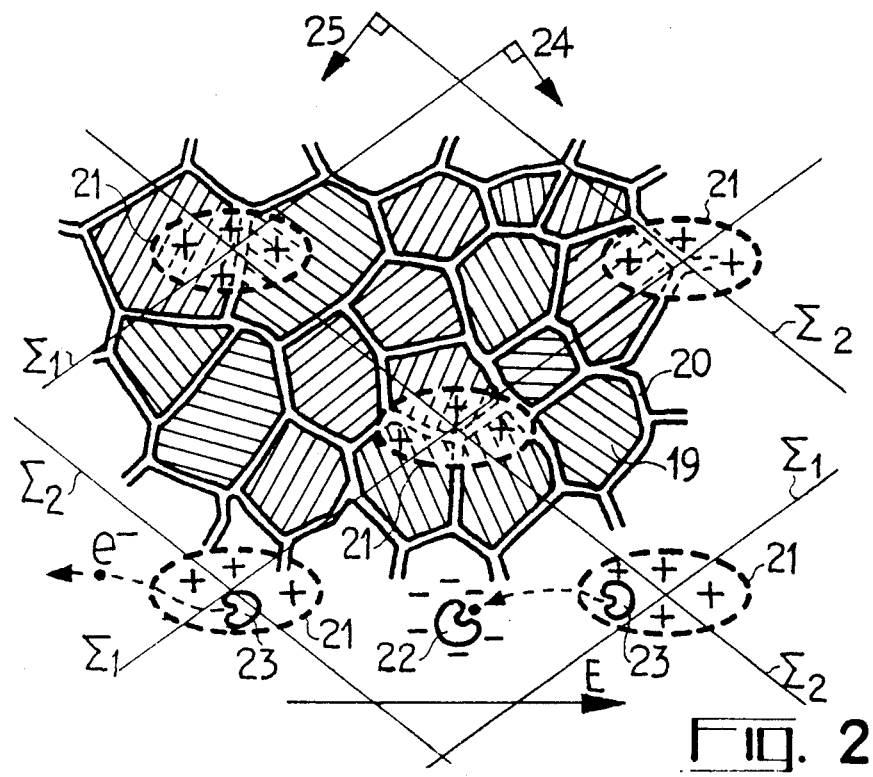
Figure 3:
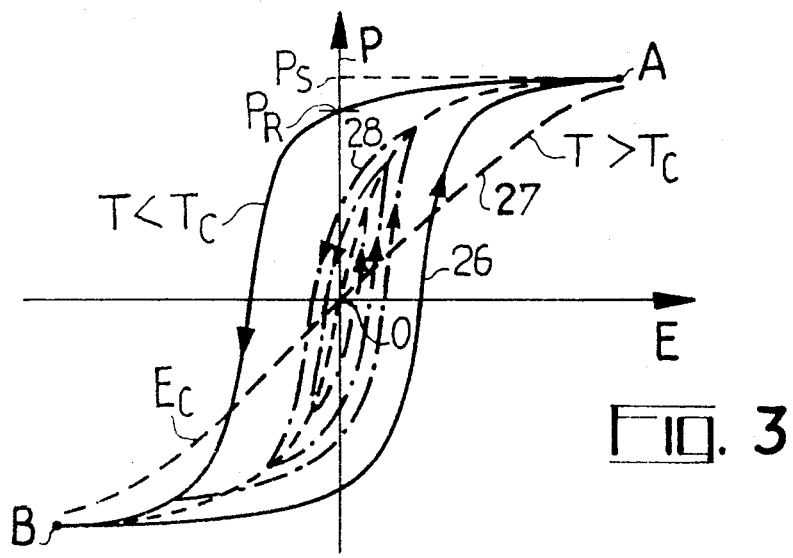
Figure 4:
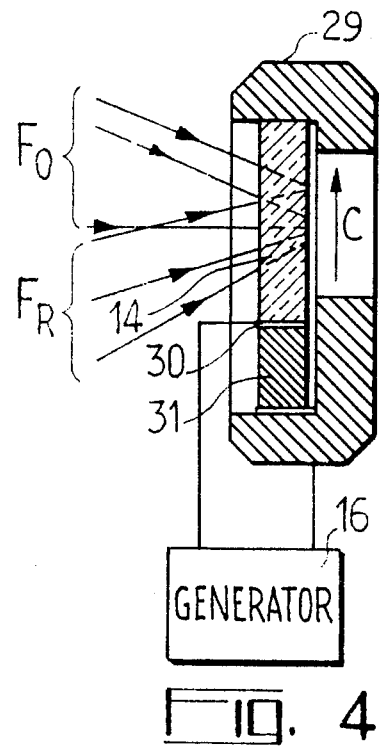
Figure 5:
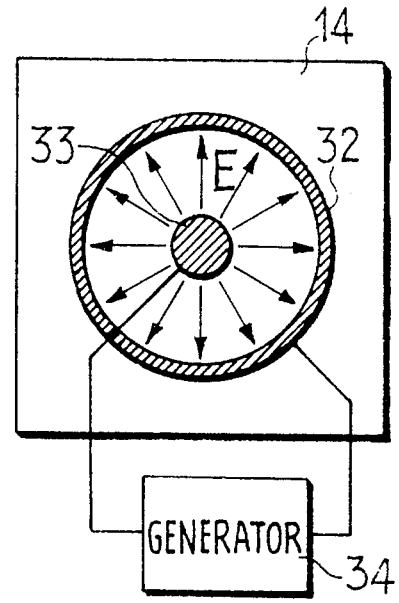
Figure 6:
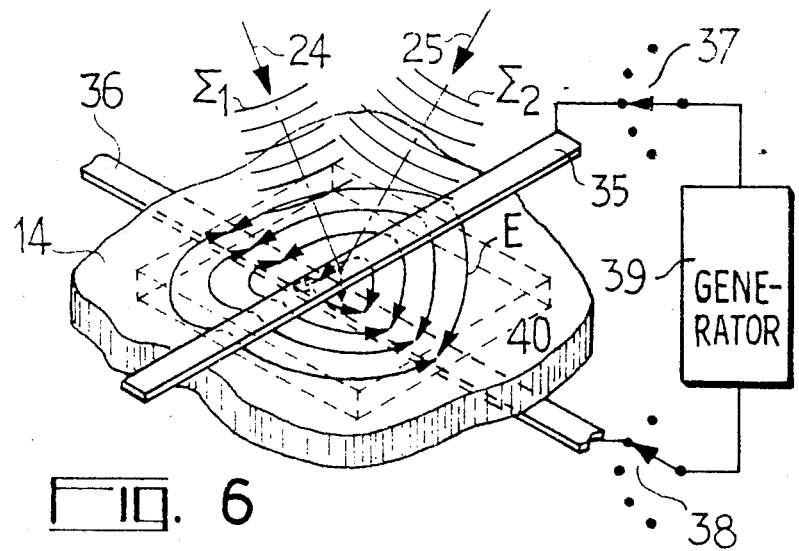

For a better understanding of the invention and to show how the same may be carried into effect, reference will be made to the ensuing description and the attached figures in which:

- FIG. 1 illustrates a holographic system in accordance with the invention;
- FIGS. 2 and 3 are explanatory figures;
- FIG. 4 illustrates a section through a first variant embodiment of the bias means provided in the system of FIG. 1;
- FIG. 5 illustrates an elevational view of a second variant embodiment of the electrical bias means;
- FIG. 6 illustrates a partial isometric view of a third variant embodiment of the electrical bias means.

The optical system with photo-induced holographic pattern shown in FIG. 1, makes it possible to store the optical information relating to an object, in the form of a phase hologram. The reconstruction of this phase hologram by means of the reference beam used to construct it, produces by a mechanism of diffraction a real or virtual image of the object. In FIG. 1, in addition to photo-inducing means for constructing a holographic pattern, means have been shown which are suitable for its read-out or erasing.

The means used to construct the holographic pattern may comprise:

a coherent light source 1, lenses 2 and 3 designed to widen the section of the light beam emitted by the source and beam splitter means comprising a semi-transparent plate 4 and a mirror 5. The light emerging from the plate 4, successively passes through a modulating object 6 of non-uniform transparency and a lens 8 designed to concentrate the modulated radiation on the polycrystalline plate 14. Another light fraction emerges from the mirror 5 and passes through the lens 9 to form a reference beam 11 which encounters the beam 10, known as the "object beam," within the volume of the plate 14. The mean direction of incidence of the beams 10 and 11 is illustrated in FIG. 1 by the arrow 13. The incidence of the beam 11 can be modified as the dashed outline of the elements 5, 9, 11 shows, by means of a position control 12 which acts upon the mirror 5 and the lens 9. The polycrystalline plate 14 is cut in a material photoexcited by the light emitted by the source 1; this photoexcitation takes place in accordance with a process described hereinafter, which requires the presence of an electrical bias state represented by the field E; the field E is generated, for example, by means of electrodes 15 connected to an electrical bias or polarization generator 16. As far as optical operation is concerned, the conditions of formation of an interference fringe network within the volume of the plate 14, are satisfied. Thus, under the influence of the photoexcitation, the progressive development of phase holographic pattern will be observed. This latter can be used in accordance with the principles of phase holography, to reconstruct the image of the object 6. During the formation of the holographic pattern, the two beams 10 and 11 interact with one another and the shutter 7 shown in FIG. 1 must be located outside the object beam. By contrast, when the shutter 7 is shifted to the position shown in broken line, the viewing device 17 no longer enables the object 6 to be seen directly. However, the holographic pattern formed in the plate 14 diffracts the reference beam 11, the forward or back scattered radiation 18 emerging from the plate 14 contains all the optical information relating to the object 6 which enables the viewing. Accordingly, thanks to the formation of the phase holographic pattern and to its reading-out by the beam 11, the image of the object 6 is suitably reconstructed.

Having described the phases of writing-in and readout of the optical information, it remains to explain the process of formation of the phase holographic pattern within the plate 14.

By way of a non-limitative example, the plate 14 can be cut from a piece of ferro-electric polycrystalline ceramic containing metal impurities. One material available for this purpose is a lead and lanthanum titanium zirconate, prepared by the sintering under pressure of samples having the composition:

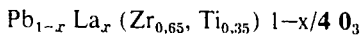

where $0.02 \leq x \leq 0.07$.

The lead oxide used to prepare the samples contains metal impurities and in particular: less than 0.002 percent by weight of iron, less than 0.008 percent by weight of silver, less than 0.005 percent by weight of bismuth and less than 0.02 percent by weight of copper. In a typical preparation, the titanium oxide contains less than 0.1 percent of iron and the lanthanum content is made equal to $x = 0.07$. The sintering of the ceramic takes place at 1,000° C for example, for a period of between 4 and 16 hours and at a pressure of between 250 and 500 kgs/cm². The sintered material is sawn and optically polished in order to produce discs 50 µ thick and 1.5 cm in diameter.

In FIG. 2, the internal structure of a small fragment of a plate 14 has been sketched.

The polycrystalline structure can be seen in the form of the grains 19 which have been cross-hatched in all directions to symbolise the ferroelectric domains; the interstices 20 between the grains are of minor importance and it can be assumed that the density of the material differs from the theoretical density by less than five thousandths. The theoretical density is that deduced from a knowledge of the molecular weights of the constituents and from a knowledge of the dimensions of the crystalline lattice measured by X-ray techniques. FIG. 2 illustrates the process of formation of a holographic pattern within the volume of the polycrystalline material. The optical interaction between an object beam and a reference beam capable of photoexciting the deep traps 22 and 23 uniformly distributed within the polycrystalline mass, has been illustrated. The object beam is symbolised by an electro-magnetic wave $\Sigma_1$ propagating in the direction 24, and the reference beam by an electromagnetic wave $\Sigma_2$ propagating in the direction 25. The coherent interaction between the waves $\Sigma_1$ and $\Sigma_2$ gives rise to a pattern of interference fringes the stationary light zones of which are symbolised by the elliptical zones 21.

During the phase of photoexcitation, the polycrystalline material exhibits a determinate polarization state in order to provide an internal electric field E. The deep traps 23 located in the illuminated zones 21, liberate free carriers under the action of the photons. In FIG. 2, the free carriers have been indicated by electrons e displacing from right to left under the action of the internal field E. The free carriers move away from the illuminated zones towards the dark zones, which produces a non-uniform electrical charge distribution. The illuminated zones acquire a positive charge since the negative charges have been retrapped in the dark regions by the traps 22. The photoexcitation produced by the fringe pattern gives rise to a charge displacement setting up an electric field which corresponds to the modulation of the electron density within the volume of the polycrystalline material. In order for this electron modulation to manifest itself in the form of a holographic pattern, it is necessary that the polycrystalline medium should be subjected to the polarization hereinbefore defined. It has been possible to create this polarization state by means of an inductor electric field applied to the polycrystalline plate. Under the effect of this electric field, the plate is polarized due to changes in the amplitude or the direction of the domain polarization. The induced polarization may also result from displacements of the domain boundaries. When the polycrystalline material has been polarized the electrooptical effect which develops is capable of converting the electron modulation produced by the light, into a phase holographic pattern.

The diagram of FIG. 3 represents the polarization P created in a polycrystalline material, as a function of the induced field E. For a temperature T which falls short of the value $T_c$, the material behaves ferroelectrically and is characterised by the existence of a hysteresis loop 26; for a temperature T higher than $T_c$, the loop is reduced to the curve 27. The temperature $T_c$ is the ferroelectric Curie temperature which depends upon the material. In the example given hereinbefore, as the proportion of lanthanum increases, it is observed that the critical temperature $T_c$ decreases whilst the transparency of the material to light increases. For a lanthanum content of around $x = 0.07$ the lead and lanthanum titanium zirconate is ferroelectric at ambient temperature and its transparency to the wavelength $\lambda$ of operation of an argon laser ($\lambda = 488$ nanometers) is such that a 50 µ thick plate transmits around 27 percent of the incident light energy.

If the material is operated at a temperature at which it is not ferroelectric (curve 27), then it is observed that it does not retain the polarization state created by the induced field. It is then necessary for the induced field to be applied during phases of writing-in and readingout the holographic pattern.

By contrast, if the material is in the ferroelectric state, then there is a remanent polarization $P_R$ in the absence of any external field. The polarization $P_R$ is lower in magnitude than the polarization $P_S$ reached at the peak of the loop 26. It is therefore possible to create the polarization state required for recording and readout of the holographic pattern prior to the start of the recording phase. Because of the polycrystalline nature of the material utilised to form the holographic pattern the polarization state can be erased by applying an alternating field of decreasing amplitude, in the material. This debiasing or depolarizing field, has an initial amplitude at least equal to that which has produced the polarization condition it is desired to erase; it brings about the return to the origin 0 of the diagram shown in FIG. 3, by a succession of decreasing hysteresis cycles 28.

The foregoing description has shown that a holographic pattern can be formed by means of the device shown in FIG. 1 in which a suitably polarized polycrystalline photoexcitable material is used to set up electronic modulation, by photo-excitation, in order to bring about modulation of the refractive index. The erasing of the index modulation can be achieved without losing the acquired electronic modulation, since it is merely necessary, to erase the polarization state to get rid of the electro-optical effect.

If the plate or strip 14 in which the holographic pattern is formed, is relatively thin in comparison with the light wavelength, it is possible to read-out the holographic pattern using light whose wavelength differs from that of the light used to form the holographic pattern. By contrast, if the holographic pattern has a substantial thickness, it is necessary to read it out using a read-out beam which in all respects is identical with the reference beam used for its formation. In this latter case, it is necessary to take into account the electrostrictive properties of the recording material since the holographic pattern can only be read-out if its dimensions remain unchanged between the phases of formation and read-out. This latter condition makes it necessary to effect read-out of the plate 14 in the same polarization state used to record it; the result is that in a polycrystalline material, by successive recordings with different polarization conditions, it is possible to produce holographic patterns which can be read out selectively in order to separately reconstitute the optical data relating to each of said recordings. The differentiation between the polarization states can be achieved by changes in amplitude or orientation.

To this technique of differentiation based upon polarization, it is possible to add a further differentiation based upon angle of incidence of the reference beam. By changing the angle of incidence with each recording, it is possible to form holographic patterns capable of selectively reconstructing the images of several objects.

As far as the polarization of the polycrystalline medium is concerned, recourse can be had to one or more sets of electrodes connected to an electrical generator used for the excitation function.

Furthermore, the plate 14 can be also polarized by the application of a mechanical stress C. This stress can be applied, as FIG. 4 shows, by arranging the plate 14 in a rigid frame 29 equipped with an electromechanical transducer 31. The transducer 31 is excited by an electrical generator 16 whose terminals are connected at the frame 29 and to the electrode 30. It goes without saying that a stress C can be applied to the plate 14 by means of a screw bearing upon the edge of the frame 29.

In FIG. 4, the polarization of the plate 14 is contrived to be substantially perpendicular to the mean direction of incidence of the object beam $F_0$ and reference beam $F_R$. In fact, this mean direction need not be parallel to the direction C or E of polarization of the plate. In any case, the ellipsoid of the indices of the polarized plate should have an orientation in relation to the light such as to effectively produce the desired modulation of refractive index.

To produce a holographic pattern having a high diffraction efficiency, the polycrystalline material can be polarized in accordance with a particular configuration. Thus, if the fringe pattern projected onto the plate 14 is formed of concentric luminous rings, then the plate 14 can advantageously be polarized radially. FIG. 5 illustrates in elevation the plate 14 with concentric electrodes 32 and 33; the electrical generator 34, coupled to the electrodes 32 and 33, makes it possible to create within the volume of the plate 14, a radial electric field E. This electrode design produces a substantial polarization within the ring 32, but not beyond if this ring is chosen as the earth electrode; it is thus possible to group in the plane of one face of the plate 14, several sets of electrodes 32 and 33 whose zones of influence differ from one another. If this kind of electrode assembly is used, it is possible to limit the recording or read-out of the holographic pattern to one or more of the zones of influence which go to make up the assembly.

In FIG. 6, another variant embodiment of the electrodes used to polarize the plate 14, can be seen. On one of the faces of a fragment of the plate 14, an elongated electrode 36 has been shown and on the other face an elongated electrode 37 which makes an arbitrary angle with the first. These electrodes, which may form part of two crossing networks arrays of wires, are supplied by a generator 39 through switches 37 and 38.

When a bias voltage is applied to the electrodes 37 and 38, the crossing point is the location of a field E acting perpendicularly to the face of the plate 14; this region is therefore not suitable for the recording of an effective holographic pattern by light waves $\Sigma_1$ and $\Sigma_2$ whose directions 24 and 25 have a mean direction normal to the plate 14. However, the region which surrounds the crossing point and extends through the volume 40 illustrated in broken-line, experiences a field E the lines of force of which have the flattened configuration shown in FIG. 6. This surrounding region will therefore be polarized in a manner such as to form an effective holographic pattern. If the electrodes 35 and 36 are provided multiply and arranged in rows and columns, then a recording volume will be obtained which is split up into elementary volumes 40 within which the recording or read-out of a local holographic pattern can be addressed by the coincidence between a row and a column. In all cases, where the electrodes are arranged in the trajectory of the light, they may be arranged to be transparent. The device shown in FIG. 1 and the variant embodiments shown in FIGS. 4 and 5, 6, operate in accordance to a cycle which can be summarised by the following steps:

- polarizing the polycrystalline material with or without a remanence effect, depending upon whether the material is or is not ferroelectric at the operating temperature; photoexcitation under the combined action of reference and object beams, in order to modulate the electrical charge distribution and thus produce a holographic pattern which is associated with the polarization state acquired by the polycrystalline material;

- erasing, if required, the holographic pattern by depolarization or by an inhibition of read-out resulting from a change of the polarization state of the polycrystalline material;

- read-out by means of the read-out beam alone, with the possible restoration of a previously existing polarization state of the diffracted radiation, reflected or transmitted by the holographic pattern, then reconstituting the stored optical data.

By way of a non-limitative example, a polycrystalline plate of lead-lanthanum titanium zirconate having a thickness of 50 $\mu$ and a photoexcited area in the form of a square having a sidelength of 1 mm, can be polarized by the application of a direct voltage of 300 to 100 volts between its faces. The formation of a holographic pattern is achieved by exposing this plate for 5 seconds to the interference radiation produced by an argon laser having a power density of 10 Watts per cm².

What we claim, is:

1. Optical system with photo-induced holographic pattern comprising:
a plate consisting of photoexcitable electro-optic material having a polycrystalline structure, photo-inducing means positioned for irradiating said plate with a pattern of interference fringes, and bias means for generating within the volume of said plate a predetermined uniform state of electrical polarization; said material having a density differing from its theoretical density by less than five thousandths; said predetermined state of electrical polarization being formed during the writing-in and reading out phases of said pattern of interference fringes; said pattern of interference fringes being constructed from the interaction of two coherent beams having a mean direction of incidence at an angle with the direction of said electrical polarization.

2. System as claimed in claim 1, wherein said bias means comprise at least one set of two electrodes arranged on said plate and an electrical excitation generator coupled to said electrodes.

3. System as claimed in claim 1, wherein said bias means comprise means for applying a mechanical stress to said plate.

4. System as claimed in claim 1, wherein said material is a ferroelectric material.

5. System as claimed in claim 4, wherein said ferroelectric material is a ferroelectric ceramic containing traces of metal impurities.

6. System as claimed in claim 5, wherein said ceramic is a lead and lanthanum titanium zirconate.

7. System as claimed in claim 2, wherein said electrodes are concentric electrodes.

8. System as claimed in claim 2, wherein said electrodes comprise at least two crossed conductive bands deposited respectively upon the two faces of said plate.

9. System as claimed in claim 1, further comprising means for erasing said state of electrical polarization.

10. System as claimed in claim 9, wherein said further means comprise electrodes coupled to an electrical generator for inducing in at least one portion of said volume, an alternating debiasing field having a decreasing amplitude.

11. System as claimed in claim 1, wherein said bias means are adjustable bias means arranged for forming in succession at least two distinct electrical bias states within the volume of said plate.

12. System as claimed in claim 11, wherein said distinct states differ from one another by their amplitudes.

13. System as claimed in claim 11, wherein said distinct states differ from one another by their orientations.

14. System as claimed in claim 1, wherein said photoinducing means direct towards said volume an object beam and a reference beam; said beams being applied during the recording phase of said pattern and one of said beams only being applied during the read-out phase of said pattern.

15. System as claimed in claim 14, further comprising position control means for changing the orientation of said reference beam with each of the successive recording steps building up said recording phase.

* * * * *